United States Patent
Won et al.

(10) Patent No.: US 7,831,967 B2
(45) Date of Patent: Nov. 9, 2010

(54) METHOD OF AND APPARATUS FOR UPDATING SOFTWARE OF NETWORK DEVICE

(75) Inventors: Jong-eun Won, Suwon-si (KR); Jung-yon Cho, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1520 days.

(21) Appl. No.: 11/177,347

(22) Filed: Jul. 11, 2005

(65) Prior Publication Data

US 2006/0031828 A1      Feb. 9, 2006

(30) Foreign Application Priority Data

Aug. 6, 2004      (KR)      .................. 10-2004-0061945

(51) Int. Cl.
*G06F 9/445* (2006.01)
*G06F 15/16* (2006.01)
*G06F 15/167* (2006.01)
*G06F 15/173* (2006.01)

(52) U.S. Cl. .................. 717/172; 717/171; 717/173; 717/174; 709/203; 709/216; 709/218; 709/244

(58) Field of Classification Search .................. None
See application file for complete search history.

(56) References Cited

U.S. PATENT DOCUMENTS

| | | | | |
|---|---|---|---|---|
| 6,151,643 A * | 11/2000 | Cheng et al. | .................. | 710/36 |
| 6,357,021 B1 | 3/2002 | Kitagawa et al. | | |
| 6,535,911 B1 * | 3/2003 | Miller et al. | .................. | 709/217 |
| 6,986,133 B2 * | 1/2006 | O'Brien et al. | .................. | 717/173 |
| 7,003,767 B2 * | 2/2006 | Larkin | .................. | 717/172 |
| 7,120,675 B1 * | 10/2006 | Shupak et al. | .................. | 709/217 |
| 7,254,811 B2 * | 8/2007 | Kouznetsov et al. | .................. | 717/173 |
| 7,389,504 B2 * | 6/2008 | Kawano et al. | .................. | 717/171 |
| 7,451,236 B2 * | 11/2008 | Savitzky et al. | .................. | 709/246 |
| 2001/0047420 A1 * | 11/2001 | Talanis et al. | .................. | 709/229 |
| 2002/0073304 A1 | 6/2002 | March et al. | | |
| 2002/0087960 A1 | 7/2002 | Hisatake | | |
| 2002/0188934 A1 | 12/2002 | Griffioen et al. | | |
| 2003/0046676 A1 * | 3/2003 | Cheng et al. | .................. | 717/173 |

(Continued)

FOREIGN PATENT DOCUMENTS

JP      2003-140902 A      5/2003

(Continued)

*Primary Examiner*—Tuan Q Dam
*Assistant Examiner*—Isaac T Tecklu
(74) *Attorney, Agent, or Firm*—Sughrue Mion, PLLC

(57) ABSTRACT

A method and apparatus for updating the software of a device that is a controlled device linked to a control device over a network. According to the method, a control device obtains information regarding updating of the software of a controlled device, determines whether updating is available using the information, and allows the controlled device to update its software, thereby easily updating the software of device. The apparatus can be a network device, connected to an update server and another network device in a network, for updating software of the other network device. The network device can include a control circuit configured to determine whether the updating of the software is required based on update information; and a transceiving unit configured to communicate with the other network device and the update server.

14 Claims, 10 Drawing Sheets

U.S. PATENT DOCUMENTS

| | | | |
|---|---|---|---|
| 2003/0066065 A1* | 4/2003 | Larkin | 717/177 |
| 2003/0110484 A1* | 6/2003 | Famolari | 717/173 |
| 2004/0083471 A1 | 4/2004 | Nam et al. | |
| 2004/0088696 A1* | 5/2004 | Kawano et al. | 717/171 |
| 2004/0210891 A1* | 10/2004 | Kouznetsov et al. | 717/168 |
| 2004/0243993 A1* | 12/2004 | Okonnen et al. | 717/168 |
| 2006/0184532 A1* | 8/2006 | Hamada et al. | 707/10 |

FOREIGN PATENT DOCUMENTS

| | | |
|---|---|---|
| JP | 2003-186690 A | 7/2003 |
| KR | 2001-0033879 A | 4/2001 |
| KR | 10-2001-0037660 A | 5/2001 |
| KR | 2001-0105724 A | 11/2001 |
| KR | 2001-0112506 A | 12/2001 |
| KR | 2002-0009275 A | 2/2002 |
| KR | 2002-0063390 A | 8/2002 |
| KR | 2003-0034367 A | 5/2003 |
| KR | 2003-0055816 A | 7/2003 |
| WO | 99/06910 A1 | 2/1999 |
| WO | WO 02/37217 A2 | 5/2002 |

* cited by examiner

FIG. 5

```
<?xml version="1.0"?>
<root xmlns="urn:schemas-upnp-org:device-1-0">
 <device>
   <deviceType>urn:schemas-upnp-org:device:tvdevice:1</deviceType>
   <friendlyName>Device A</friendlyName>
   <manufacturer>Samsung Electronics</manufacturer>
   <manufacturerURL>http://www.sec.co.kr</manufacturerURL>
   <modelDescription>Samsung Linux TV Device Emulator 1.0</modelDescription>
   <modelName>Set-Top Box</modelName>
   <modelNumber>1.0</modelNumber>
   <modelURL>http://www.sec.co.kr/TVEmulator/</modelURL>
   <UDN>uuid:Samsung-Linux-TV-Emulator-1_0-1234567890123</UDN>          /502
   <UpdateServer>http://update.sec.co.kr/script=update.dll?Set-top-box=1.0
   </UpdateServer>                    /504
   <SWVersion>MediaServer:1.0.18</SWVersion>
```

METHOD OF AND APPARATUS FOR UPDATING SOFTWARE OF NETWORK DEVICE

BACKGROUND OF THE INVENTION

This application claims the priority of Korean Patent Application No. 10-2004-0061945,, filed on Aug. 6, 2004,, in the Korean Intellectual Property Office, the disclosure of which is incorporated herein in its entirety by reference.

1. Field of the Invention

The present invention relates to a method and apparatus for updating the software of a device over a network, and more particularly, to a method of updating the software of a controlled device over a network by automatically determining whether updating of the software is required, using a control device and updating the software when it is determined updating is required.

2. Description of the Related Art

Development of a home network or a local network allows devices on a network to be controlled via a user interface of a control device, thus devices operating over a network have been gradually increased. Such a device may be a personal computer, a printer, a refrigerator, a washing machine, a microwave oven, or an audio/video (A/V) appliance.

Further, continuous advancement in the functions of devices that can access a network results in the need to frequently change the software of devices.

FIG. 1 illustrates a conventional method of updating the software of a device. Referring to FIG. 1, a device A 102 and a device C 104 are connected directly to the Internet 106, and a device B 106 is connected to the device C 104 via a network 108. An update server 112 supporting updating of these devices A 102, B 106, and C 104 is further connected to the Internet 106.

The device A 102 directly accesses the update server 110 via the Internet 106, while the device B 106 accesses the update server 112 via an interface to the device C 104. In the case of both the device A 102 and the device B 106, a user checks whether the software of the device A 102 and the device B 106 can be updated, via a display unit 102a of the device A 102 and a display unit 104a of the device C 104, respectively, and controls updating of their software.

Updating of the software of the device A 102 and the device B 106 will be performed as follows:

(i) When updating of the software of the device A 102:

A user determines whether updating of the software of the device A 102 is required, using the display unit 102a, of the device A 102. Specifically, in order to determine whether updating is required, the device A 102 accesses the update server 112 via the Internet 108 periodically or in response to a user's request, and informs the user of the result of determination via the display unit 102a.

If updating is required, the user transmits an updating command to the device A 102 via an input device such as a remote controller.

In receipt of the updating command, the device A 102 downloads files required for updating from the update server 112, updates its software, and displays the result of updating on the display unit 102a.

(ii) When updating of the software of the device B 106:

The device B 106 does not include a display unit and thus updates its software with the help of the device C 104, such as a personal computer, that includes the display unit 104a. Thus, the user determines whether updating of the software of the device B 106 is required, using the display unit 104a, of the device C 104.

Specifically, the device C 104 accesses the update server 112 via the Internet 108 periodically or in response to a user's request so as to determine whether updating of the software of the device B 106 is required, and informs the user of the result of determination via the display unit 104a.

If updating is required, the user transmits an updating command to the device C 104 via an input device such as a remote controller.

In receipt of the updating command, the device C 104 downloads files required for updating from the update server 112, transmits the downloaded files to the device B 106 using a specific transport unit and transmission method so as to allow the device B 106 to update the software, and displays the result of updating on the display unit 104a.

Accordingly, when using the conventional method of updating the software of a device, it is difficult to determine whether updating of the software of a device, such as the device B 106, which does not include a display unit or is controlled by another device over a network, is required. In particular, since the device B 106 is not connected to a global network, e.g., the Internet, a process of updating its software is complicated.

In the conventional method, a user must determine whether updating of the software of a device is required and updates the software when updating is required. Thus, the more the number of devices in a network there are, the more difficult the process of updating the software of the devices is.

Also, the conventional method is so complicated that it is possible for only those who are accustomed to information technology, that is, those who can skillfully handle a control device, e.g., a computer, that controls other devices, to update the software of a device such as the device B 106.

SUMMARY OF THE INVENTION

Exemplary embodiments of the present invention provide a simple, automated method of updating the software of a device over a network.

According to an exemplary embodiment of the present invention, there is provided a method of updating software of a device over a network, the method comprising obtaining location of an update server required to update the software of the device and information regarding version of the software by a control device that performs controls on the network; determining whether the updating of the software is required based on update information regarding the device by the control device; and updating the software of the device by controlling the device when the updating is required by the control device.

According to another exemplary embodiment of the present invention, there is provided a network device, connected to an update server and at least one other network device, for updating software of another network device, the network device including: a control circuit configured to determine whether the updating of the software is required based on at least update information of the other network device; and a transceiving unit configured to communicate with the other network device and the update server, wherein the network device obtains location information of the update server, and wherein the network device controls the other device such that the software of the other device is updated.

The network is preferably a universal plug and play, and the location of the update server and the information regarding the version of the software are preferably contained in a device description.

BRIEF DESCRIPTION OF THE DRAWINGS

The above and other aspects and advantages of exemplary embodiments of the present invention will become more apparent by describing in detail exemplary embodiments thereof with reference to the attached drawings in which:

FIG. 5 illustrates a device descriptor used in a method of updating the software of a device over a network according to an exemplary embodiment of the present invention;

DETAILED DESCRIPTION OF EXEMPLARY EMBODIMENTS OF THE INVENTION

Figure 1:
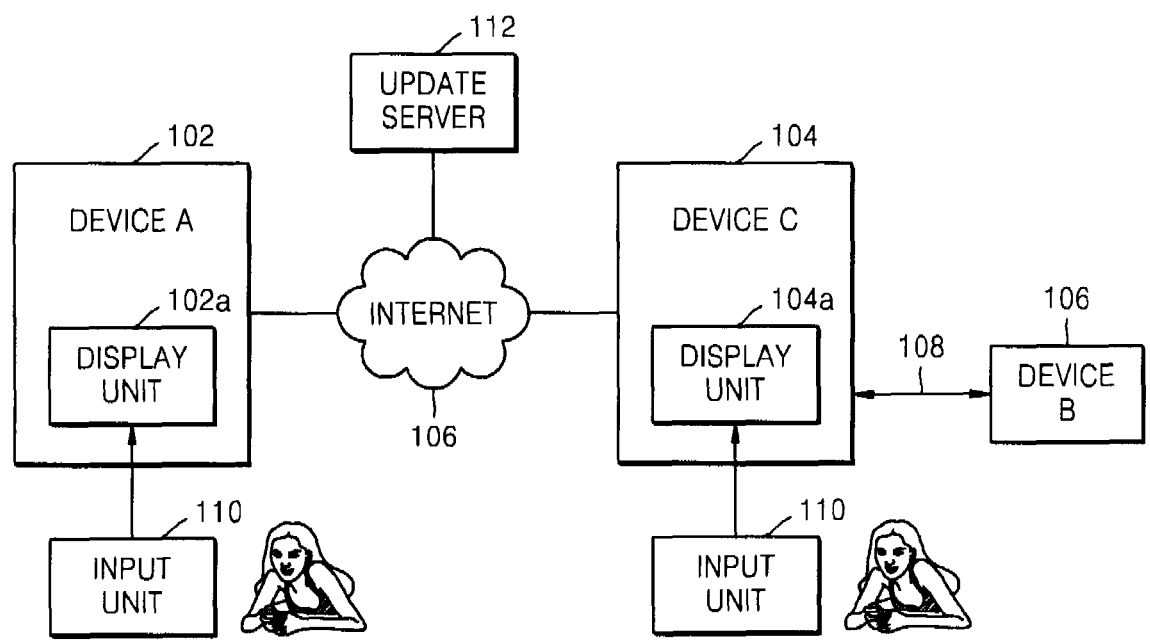
FIG. 1 illustrates a conventional method of updating the software of devices.

Hereinafter, exemplary embodiments of the present invention will be described in detail with reference the accompanying drawings. The same reference numerals represent the same elements throughout the drawings.

According to an exemplary embodiment of the present invention, each device of a network contains information required to update its software (hereinafter referred to as "update information") and provides it to a control device. The control device inquires of an update server about whether updating of the software is required, based on the update information contained in the devices. The software of the devices is updated under the control of the control device according to the result of inquiry.

The update information of each of the devices contains at least information regarding the position of each of the devices over the network, i.e., a Universal Resource Location (URL), and information regarding the version of the software of each of the devices that needs to be updated.

Figure 2:
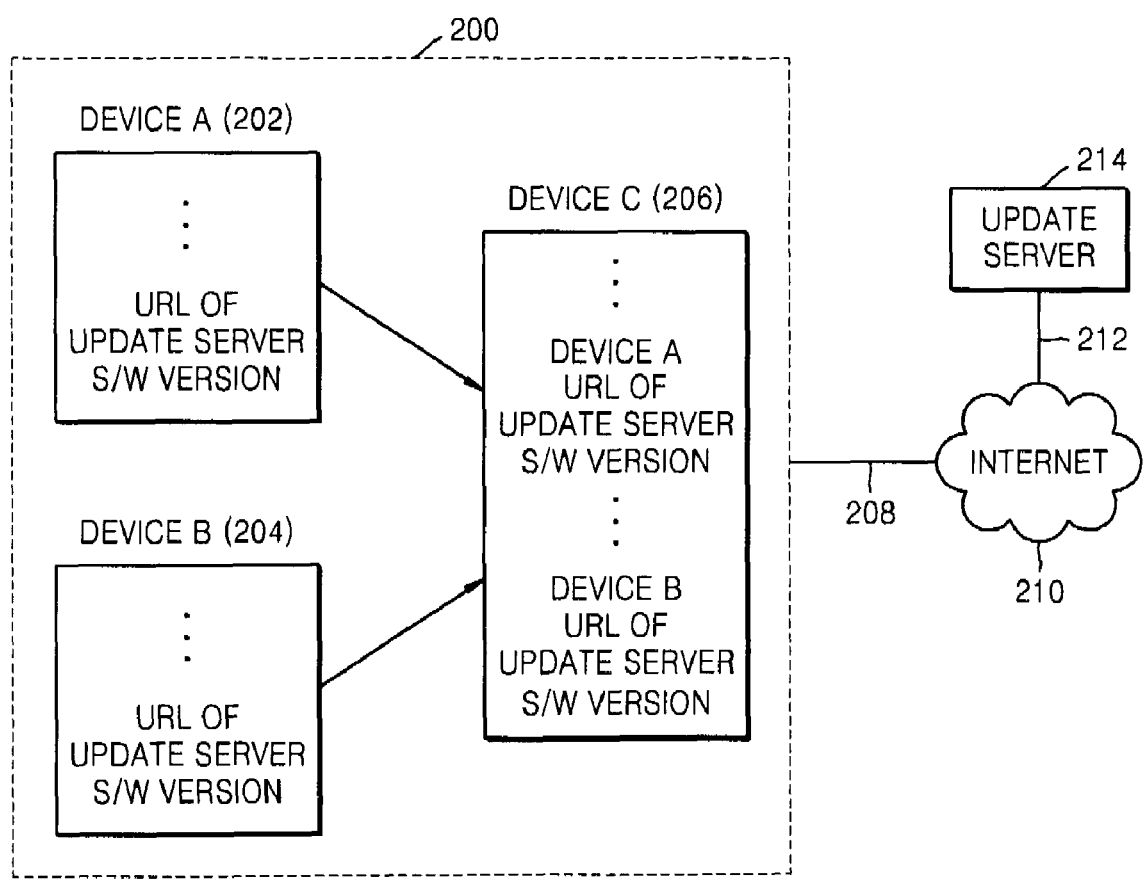
FIG. 2 illustrates a method of updating the software of a device according to an exemplary embodiment of the present invention.

FIG. 2 illustrates a method of updating the software of a device A 202, a device B 204, and a device C 206 according to an exemplary embodiment of the present invention. Referring to FIG. 2, the device A 202, the device B 204, and the device C 206 over a network 200 contain their own update information. As will be later described in detail, the update information may be contained in a device description and specify an update server 214 and the version of the software of a device that needs to be updated.

The device C 206, which controls updating of the software of the network device, contains update information of the device A 202 and the device B 204 which are connected over a network. The device C 206 inquires of the update server 214 about whether updating of the software of the device A 202 and the device B 204 is required, based on the update information. When updating the software of the device A 202 or the device B 204 is required, the device C 206 informs a user of the result of inquiry via a display unit (not shown) and performs a process of updating the software of the corresponding device in response to a user's request. The process includes downloading files required for updating, transmitting the downloaded files to the device A 202, and controlling the updating of the software.

In the method of FIG. 2, the device C 206 periodically or non-periodically informs the user of whether updating of the software of the device A 202 and the device B 204 is required, thereby avoiding a user having to check whether updating is required. Accordingly, it is possible to improve a user's convenience by connecting a display unit to the control device, and further update the software of a device to which the display unit cannot be connected.

In the method of FIG. 2, the device C 206 overall controls updating of the software of devices in response to an updating command given by a user. Thus, even if a user cannot skillfully control devices such as a computer, the user can easily update the software of devices.

Also, devices can inform another device of their respective states in a method of updating the software of a device over a network according to an exemplary embodiment of the present invention, and the method is performed over a network under the control of a control device.

For instance, the universal plug & play (UPnP) permits easy and convenient communications among a service and apparatuses, e.g., an information household appliance, a wireless communication apparatus, and a PC-related tool, which are widely dispersed. The UPnP is an extension of the PnP that allows connection of peripherals in the MS window environment, adopted by Microsoft. The UPnP is applicable to more various types of devices than the PnP. The UPnP is based on peer-to-peer communications between appliances and uses the existing transmission control protocol/Internet protocol (TCP/IP).

Devices that support the UPnP are classified into a control device and a controlled device. The control device detects or controls other devices, and the controlled device performs commands given from the control device.

Figure 3:
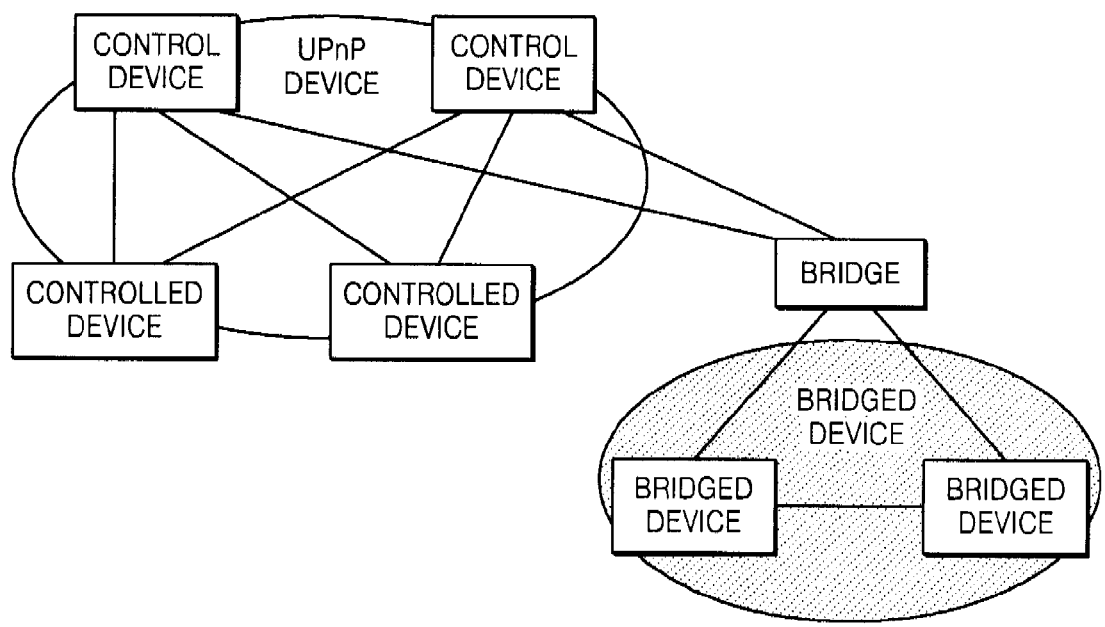
FIG. 3 illustrates the operations of devices over universal plug & play (UPnP), and the relation between the devices.

FIG. 3 illustrates the operations of devices over a UPnP network and the relationship among them. A control device detects and controls controlled devices. Each of the controlled devices performs various types of services. For example, a videocassette recorder (VCR) can perform reproduction or recording on its own, and it can perform a corresponding service in response to a command from the control device. Devices that do not support the UPnP are connected to an UPnP network via a bridge that is a protocol conversion unit.

Figure 4:
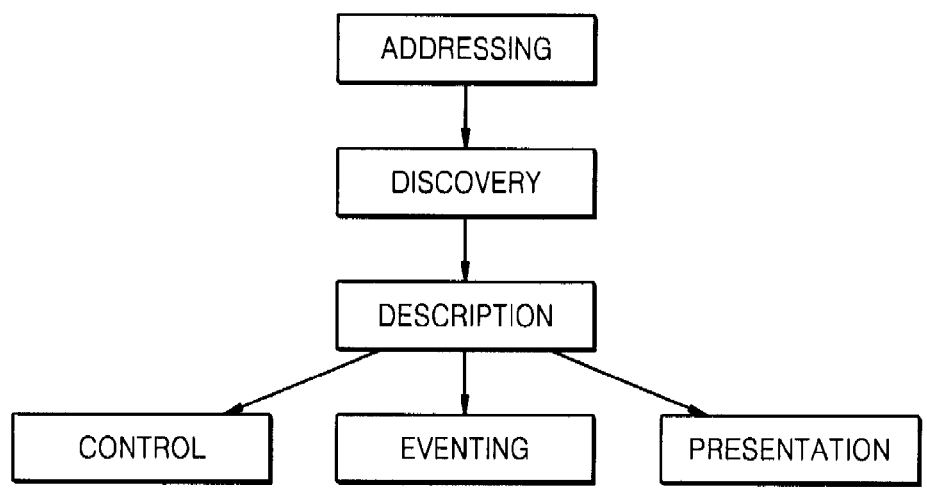
FIG. 4 illustrates the operations of UPnP network.

FIG. 4 illustrates the operations of the UPnP network. The operations will now be described in detail step by step.

addressing: The UPnP network is an IP-based network that requires devices to have their own IPs. Therefore, an IP is first allocated to a device that is to be connected to the UPnP network. A device that desires to connect to the UPnP network detects a dynamic host configuration protocol (DHCP) server so as to obtain an IP. When the device obtains the IP, it becomes a DHCP client.

discovery: After addressing, controlled devices are detected. A control device detects controlled devices using a simple service discovery protocol (SSDP). When the control device detects controlled devices, the controlled devices respond to the detection. When a controlled device accesses the UPnP network, this fact is automatically informed to other devices, and also, whether the controlled device continues or completes accessing is periodically informed to them.

description: When a controlled device is detected, a service the controlled device has to perform must be recognized. Thus, when the control device detects the controlled device, the controlled device informs the control device of a URL in which the description of the controlled device made in an extensible Markup Language (XML) format is stored. The control device reads the description from the URL. The description includes information regarding the manufacturer of the device, product information regarding a model and a serial number, and a service list.

control: The control device analyzes services that the controlled device must perform, specified in the description, and gives a command to the controlled device according to the result of analysis. In this case, an XML/simple object access protocol (SOAP) is used.

eventing: In a home network, the state of a device changes according to the ambient atmosphere. Since such changes provide a user with important information, the changes are defined as events in the UPnP. Thus, the control device pays attention to a change in the state of a controlled device, and the controlled device sends the control device an event message when the state of the controlled device changes. An event consists of a pair of name and value and uses a general event notification architecture (GENA) protocol in the XML format.

presentation: The control device can read a hypertext markup language (HTML) page related to a controlled device. The HTML page shows a user interface related to use of the controlled device. Through the user interface, it is possible to control the controlled device or recognize the state of the controlled device.

According to an exemplary embodiment of the present invention, the device description may further include the update information of the device, e.g., information about an update server and the version of the software to be updated.

FIG. 5 illustrates a device descriptor used in a method of updating the software of a device according to an exemplary embodiment of the present invention. In FIG. 5, 502 denotes information regarding a URL of an update server, and 504 denotes software version information.

In the operations described with reference to FIG. 4, update information regarding devices is contained in the control device. The control device inquires of an update server about whether updating of the software of the devices is required, based on the contained update information. Various methods can be used for this inquiry but a common gateway interface (CGI) is generally used.

A CGI script is a technology used for a dynamic web site. For instance, a counter, a visitor's list, a bulletin board, and an application for order are made using the CGI script. For operation of a web site, a client may store the CGI scripts in a cgi-bin directory or make an additional directory for the CGI scripts.

When the control device makes CGI scripts contain update information of a device, e.g., a product name, a software name, and the version number of the software, using the XML, and transmits the CGI scripts to an update server related to the device, the update server determines whether the software of the device needs to be updated based on the update information and sends the control device the result of determination.

Figure 6:
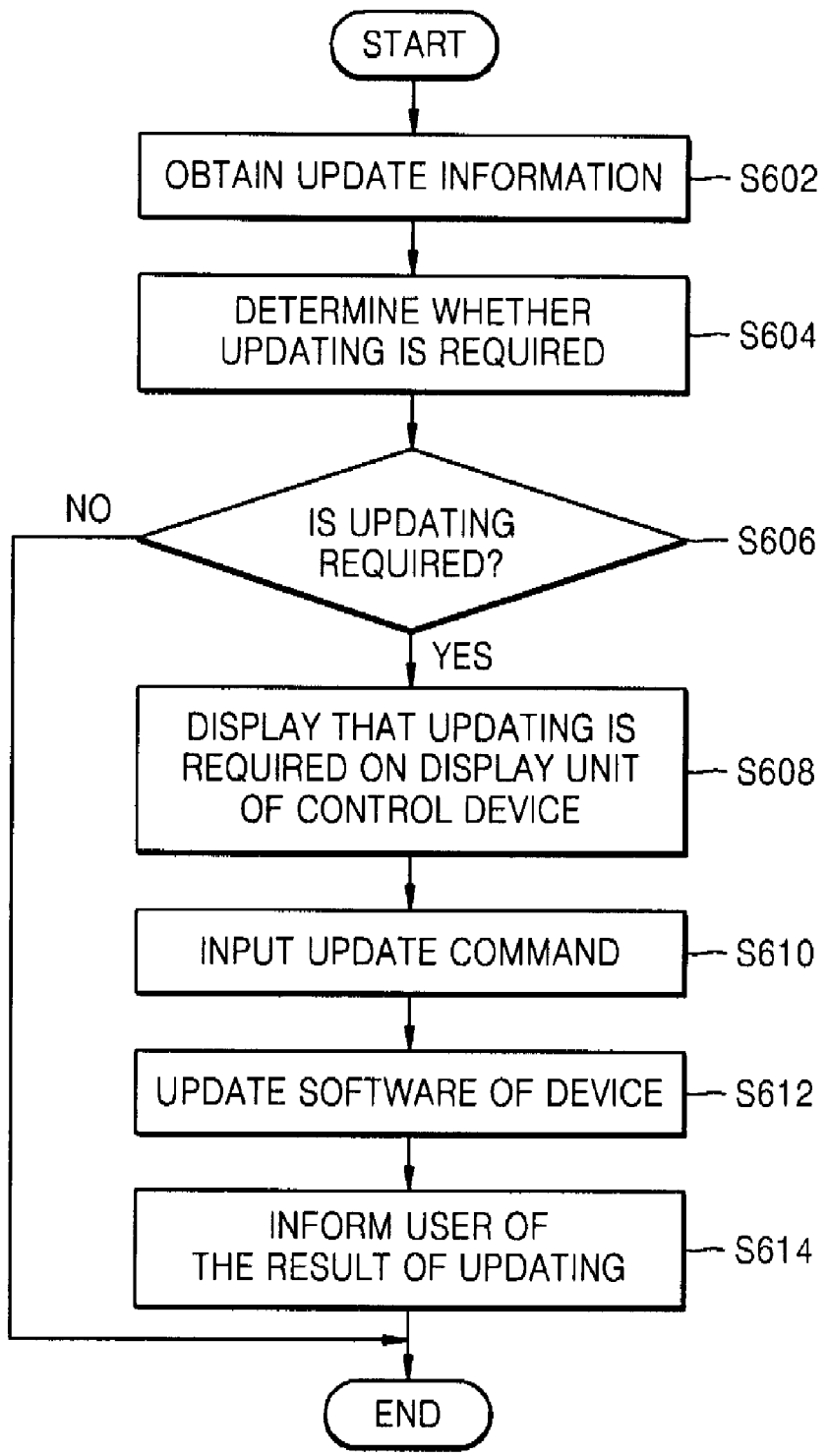
FIG. 6 is a flowchart illustrating a method of updating the software of a device according to an exemplary embodiment of the present invention.

FIG. 6 is a flowchart illustrating a method of updating the software of a device according to an exemplary embodiment of the present invention. Referring to FIG. 5, a control device obtains update information regarding the device over a network (S602).

Next, the control device reads the update information of the device and inquires of an update server about whether updating of the software of the device is required (S604).

When it is determined that updating of the software is required (S606), the control device informs a user of the result of determination via a display unit (S608).

Next, the user determines whether updating the software is required via the display unit of the control device, and inputs an updating command to the control device via an input device (S610).

Upon receiving the updating command, the control device updates the software while communicating with the device (S612). Specifically, the control device downloads files required for updating from the update server and provides the files to the device. Then, the device updates its software using the files and informs the control device of the result of updating.

Next, the control device informs the user of the result of updating via the display unit (S614).

Figure 7:
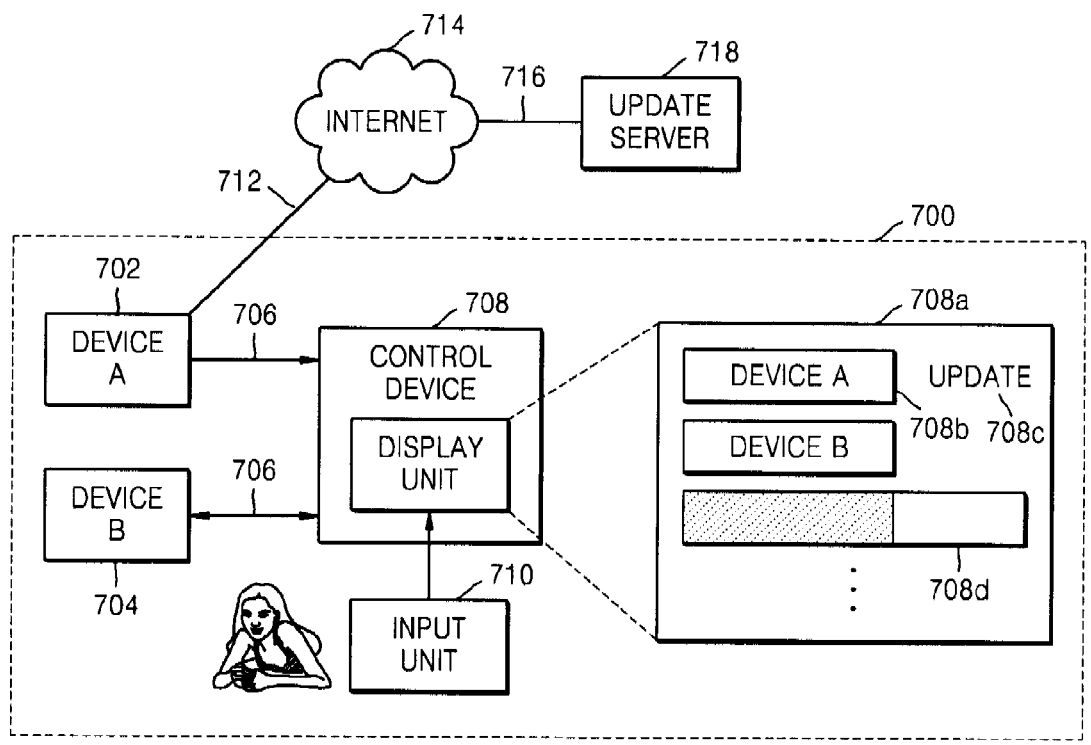
FIG. 7 is a diagram illustrating a method of updating the software of a device according to an exemplary embodiment of the present invention.

FIG. 7 is a diagram illustrating a method of updating the software of a device according to an exemplary embodiment of the present invention. Referring to FIG. 7, a device B 704 accesses an update server 718 via a device A 702.

In a home network 700 such as an UPnP network, the device A 702, the device B 704, and a control device 708 are linked to one another via a local network 706 such as the Ethernet or IEEE1394. The device A 702 accesses directly the Internet 714 to download its update information and files for updating from the update server 718.

A user can read update information of the device A 702 and the device B 704 via a display unit 708a of the control device 708. When the software of the device A 702 can be updated, the control device 708 displays update information 708b, and 708c, on the display unit 708a.

The user reads the update information 708b, and 708c, and sends an updating command to the control device 708 using an input unit 710 such as a remote controller. Then, the control device 708 performs a process of updating the software of the device A 708 via the local network 706. The progress (or result) 708d, of updating is displayed on the display unit 708a.

Figure 8:
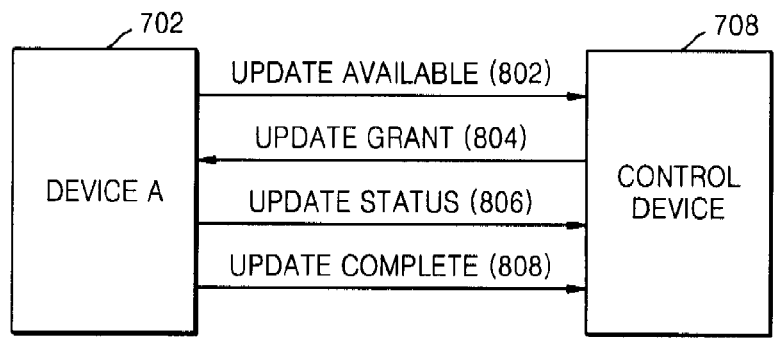
FIG. 8 is a diagram illustrating the method of FIG. 7, performed between a controlled device and a control device.

FIG. 8 illustrates the method of FIG. 7, performed between the control device 708 and the device A 702 that is a controlled device. The device A 702 periodically accesses the Internet 714 to access the update server 718 and determine whether its software must be updated.

When updating is required, the device A 702 sends the control device 708 an update available message 802. To send the update available message 802 can be implemented by sending an event with eigen variables of a vendor on the UPnP network.

The control device 708 informs a user of whether updating is available via the display unit 708a.

The user instructs the control device 708 to update the software of the device A 702 via the input unit 710 such as a remote controller, a keyboard, a touch pad, or a mouse.

Then, the control device 708 sends the device A 702 an update grant message 804 to instruct the device A 702 to start updating.

The device A 702 starts updating via the update server 718 and sends the control device 708 an update status message 806 indicating the process of updating. The control device 708 displays the update status message 806 on the display unit 708a.

After the updating of the software, the device A 702 sends the control device 706 an update complete message 808 indicating that updating is completed. This process may be performed by generating an event in the UPnP network using eigen variables of a vendor.

During updating, other operations between the control device 706 and the device A 702 are prevented.

Figure 9:
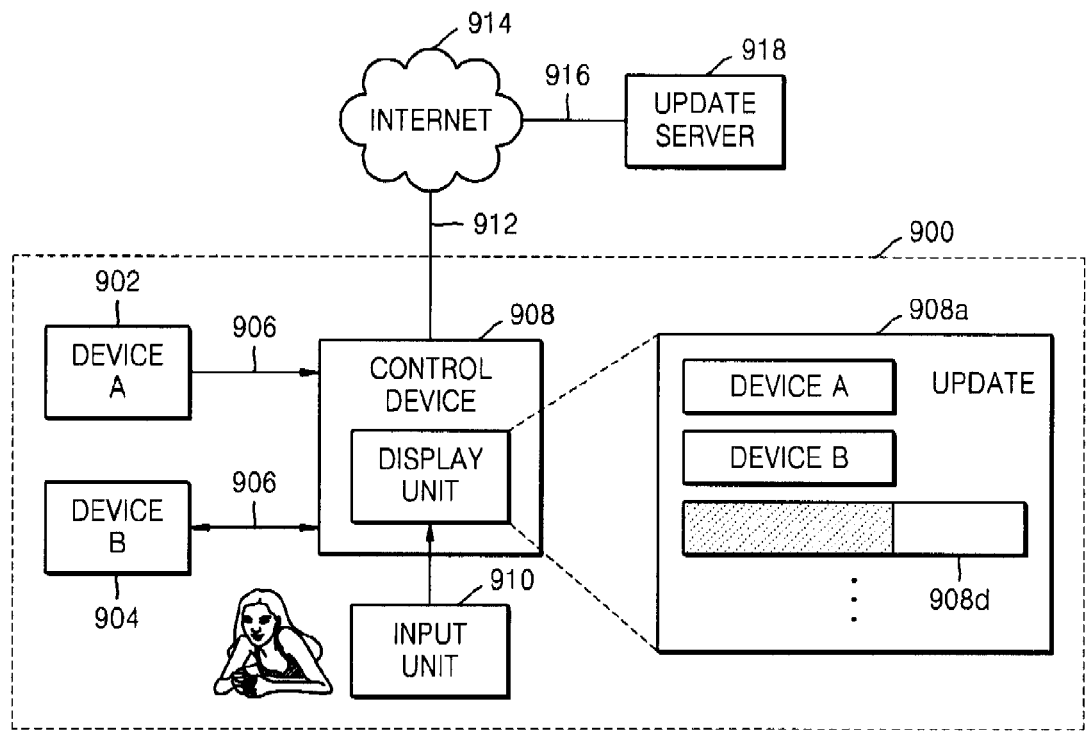
FIG. 9 is a diagram illustrating a method of updating the software of a device according to another exemplary embodiment of the present invention.

FIG. 9 is a diagram illustrating a method of updating the software of a device according to another exemplary embodiment of the present invention. In this exemplary embodiment, a control device 908 can be connected directly to the Internet 914. Referring to FIG. 9, in a home network 900 such as the UPnP network, a device A 902, a device B 904, and the control device 908 are linked to one another via a local network 906 such as the Ethernet or IEEE1394. In this exemplary embodiment, the software of the device A 902 is to be updated, and the control device 908 can access the Internet 914 to access an update server 914.

In this method, the control device 908 obtains update information, such as that shown in FIG. 5, of the device A 902 to detect the URL 502 of the update server 918 and software version information 504 of the device A 902. Next, the control device 908 determines whether updating of the software of the device A 902 is required, via the update server 918. When it is determined that updating is required, the control device 908 informs a user of the determination result 908c. Then, the user inputs an updating command to the control device 908 via an input device 910 such as a remote controller.

Next, the control device 908 sends the updating command to the device A 902, and the device A 902 prepares an updating process and requests the control device 908 to provide it with files required for updating. The files for updating are transmitted in real time or through buffering. A progress indicator 908d, of updating may be displayed on a display unit 908a, of the control device 908.

Figure 10:
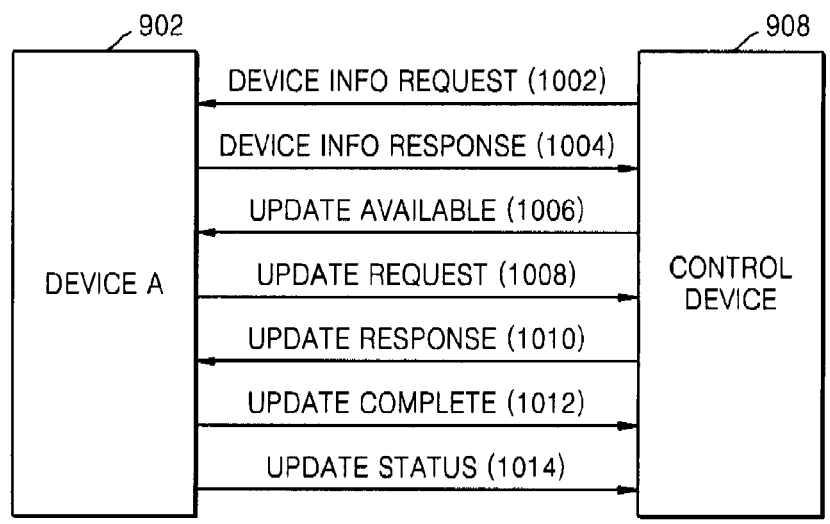
FIG. 10 is a diagram illustrating the method of FIG. 9, performed between a controlled device and a control device.

FIG. 10 illustrates the method of FIG. 10, performed between the control device 908 and the device A 902 that is a controlled device. Referring to FIG. 10, the control device 908 obtains update information, such as that shown in FIG. 5, regarding the device A 902 using a device information request message 1002 and a device information response message 1004. Also, the control device 908 obtains the URL 502 of the update server 918 and software version information 504 from the updated information.

The control device 908 periodically determines whether the software of the device A 902 must be updated through the update server 918, using the obtained updated information.

When updating of the software is required, this fact is displayed on the display unit 908a.

The user inputs an updating command to the control device 908 via the input device 910 such as a remote controller, a keyboard, a touch pad, or a mouse.

Then, the control device 908 sends an update available message 1006 to the device A 902.

The device A 902 sends an update request message 1008 to the control device 908, the control device 908 downloads files required for updating from the update server 918 in response to the update request message 1008, and provides the device A 902 with the files through an update response message 1010. This process may be performed in real time or through buffering.

When the device A 902 completes updating using the downloaded files, it sends the control device 908 an update complete message 1012 so as to inform that the updating is completed. A progress or result of the updating is informed to the control device 908 through an update status message 1014. This process may be performed by generating an event in the UPnP network using eigen variables of a vendor such as an update status variable.

Figure 11:
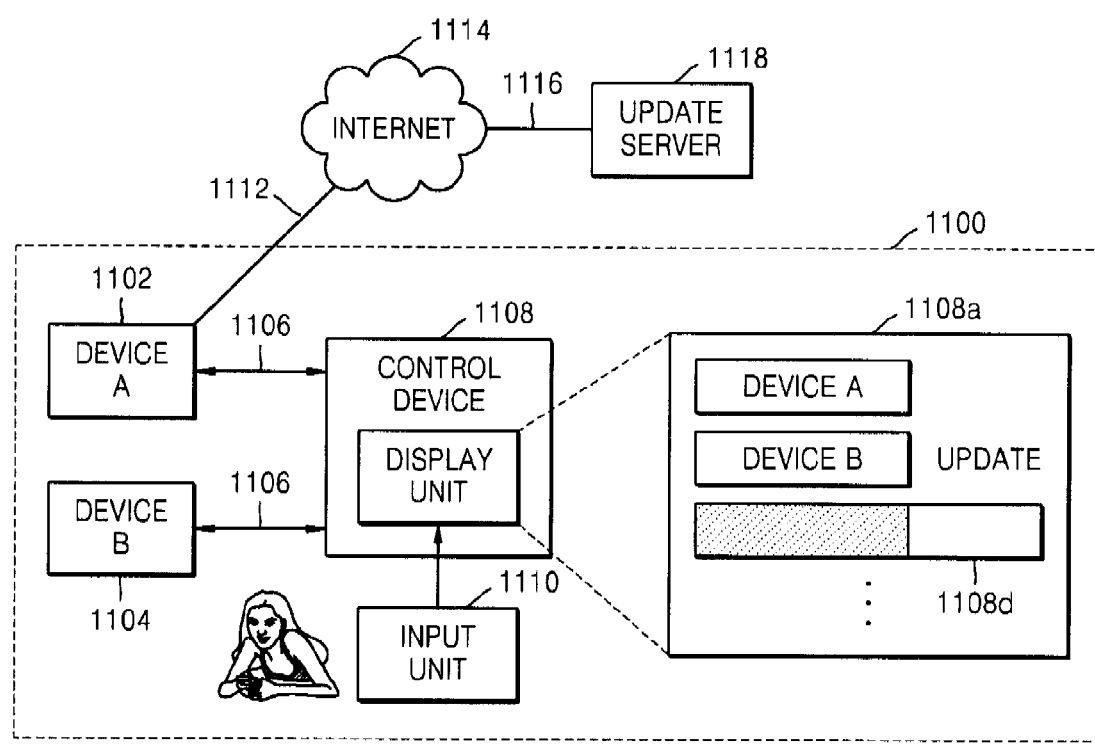
FIG. 11 is a diagram illustrating a method of updating the software of a device according to yet another exemplary embodiment of the present invention.

FIG. 11 is a diagram illustrating a method of updating the software of a device according to yet another exemplary embodiment of the present invention. In this exemplary embodiment, a device in a home network 1100 such as the UPnP network can be connected to the Internet. Referring to FIG. 11, the device A 1102, a device B 1104, and a control device 1108 are linked to one another in the home network 1100 via a network link 1106 such as the Ethernet or IEEE1394. In this exemplary embodiment, the software of the device B 1104 is to be updated, and the device A 1102 can be connected to an update server 1118 via the Internet 1114.

In this method, the control device 1108 obtains update information, such as that shown in FIG. 5, regarding the device B 1104, extracts URL 502 of the update server 1118 and software version information 504 regarding the device B 1104 from the update information, and requests the device A 1102 to determine whether updating of the software of the device B 1104 is required.

The device A 1102 obtains the update information regarding the device B 1104 from the update server 1118 and provides it to the control device 1108. Next, the control device 1108 displays the update information on a display unit 1108a.

A user views the update information on the display unit 1108a, and instructs the control device 1108 to update the software of the device B 1104 via an input unit 1110 such as a remote controller. Then, the control device 1108 sends this instruction to the device B 1104, and the device B 1104 prepares updating and requests the control device 1108 to update the software of the device B 1104.

Next, the control device 1108 requests the device A 1102 to provide it with files required to update the software of the device B 1104.

Figure 12:
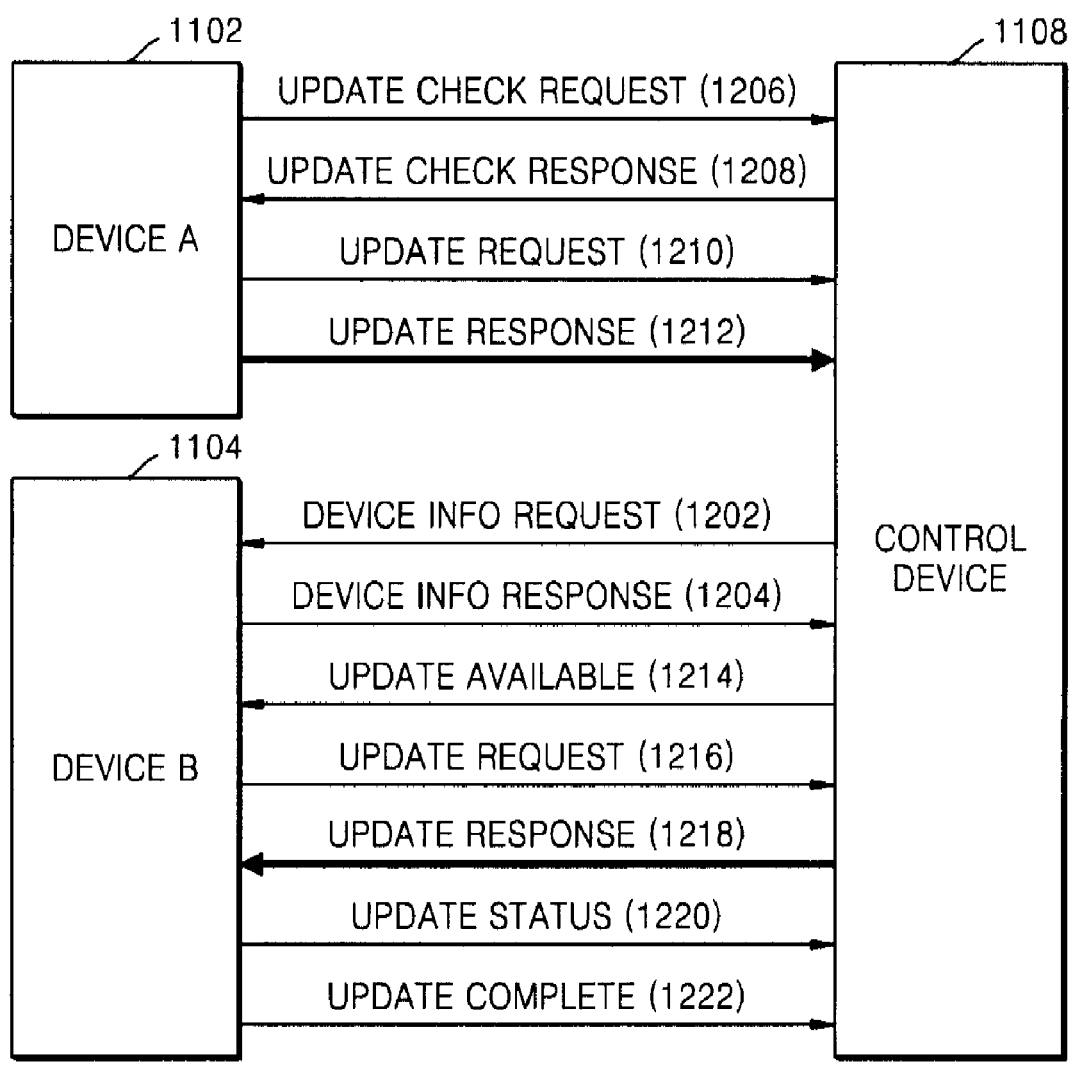
FIG. 12 is a diagram illustrating the method of FIG. 11, performed between controlled devices and a control device.

FIG. 12 illustrates the method of FIG. 11, performed among the control device 1108, the device A 1102, and the device B 1104. In this exemplary embodiment, the control device 1108 obtains update information, such as that shown in FIG. 5, regarding the device B 1104 using a device information request message 1202 and a device information response message 1204, and extracts a URL 502 of an update server 1118 and software version information 504 regarding the device B 1104 from the update information.

The control device 1108 sends the device A 1102 an update check request message 1202. Then, the device A 1102 accesses the update server 1118 to determine whether updating of the software of the device B 1104 is required, based on the URL 502 and the software version information 504, and provides the result of determination to the control device 1108 through an update check response message 1208.

When updating is required, the control device 1108 informs a user of this fact via the display unit 1108a. The user instructs the control device 1108 to update the software of the device B 1104 via the input device 1110 such as a remote controller, a keyboard, a touch pad, or a mouse.

Next, the control device 1108 informs the device B 1104 that updating is available, using an update available message 1214. Then, the device B 1104 prepares updating and requests the control device 1108 to update the software of the device B 1104 using an update request message 1216.

The control device 1108 requests the device A 1102 to perform updating, using an update request message 1210. The device A 1102 downloads files required for updating from the update server 1118 in real time and provides them to the control device 1108 using an update response message 1212. Alternatively, the device A 1102 may provide the control device 1118 with files that were stored, using the update response message 1212.

Next, the control device 1108 sends the device B 1104 the files provided from the device A 1102, using an update response message 1218. When the device B 1104 completes updating using the files, it sends the control device 1108 an update complete message 1222 to inform the control device 1108 of this fact. A progress or result of updating is informed to the control device 1108 using an update status message 1220. This process may be performed by generating an event using eigen variables of a vendor such as an update status variable, and providing the event to the control device 1108 in the UPnP network.

In a method of updating the software of a device over a network according to the present invention, updating can be controlled in the way of centralized control via a display unit of a control device. For instance, it is possible to easily update the software of a device into which a display unit cannot be installed, a device that includes a display unit that is hardly used, and a device that includes a display unit that is inconvenient to be handled due to an uncomfortable user interface (UI), using a control device with a display unit.

As described above, in a method of updating the software of a device over a network according to an exemplary embodiment of the present invention, a control device obtains information regarding updating of the software of a device, determines whether updating is available based on the information, and allows the device to update its software, thereby easily updating the software of device.

Also, according to the method, updating of the software of a device can be controlled by a central device via a display unit of a control device.

Figure 13:
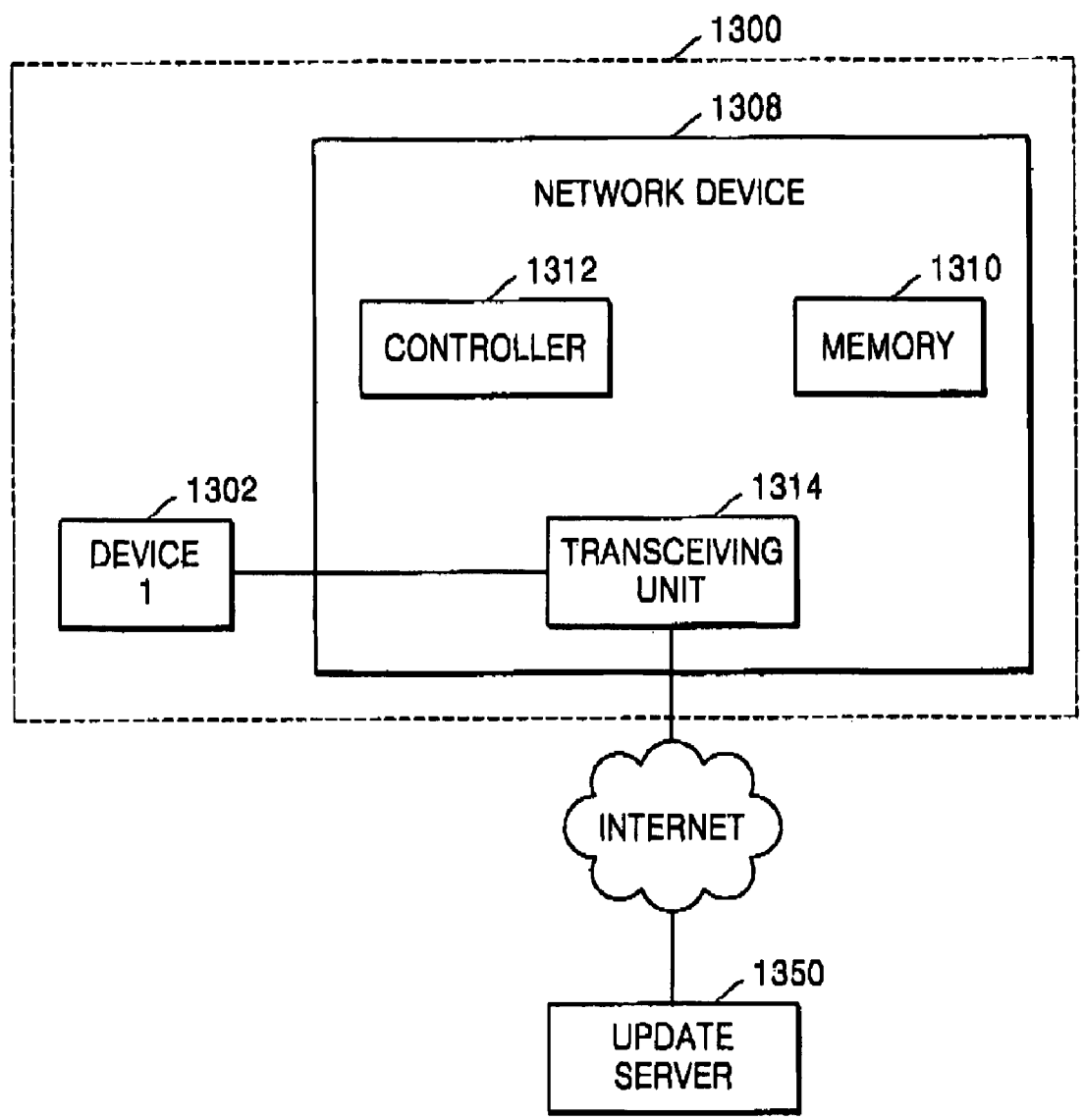
FIG. 13 is a block diagram of a network device according to an exemplary embodiment of the present invention.

FIG. 13 is a block diagram of a network device according to an exemplary embodiment of the present invention. In FIG. 13, there is provided a network device 1308 for updating the software of at least one other device 1302 in a same network 1300 as the network device 1308. The network device 1308 can include: a memory 1310 that can store update information relating to another device 1302 in network 1300; a transceiving unit 1314 configured to communicate with the other device 1302 and an update server 1350, via the Internet, for example; and a control circuit 1312 configured to perform a number of functions, including, for example, determining whether the updating of software of the other network device 1302 is required based on update information. In an alternative exemplary embodiment of the above-described network device 1308, the memory 1310 for storing update information relating to another device can be omitted as a component of the network device 1308. The above-mentioned network 1300 can be a universal plug and play network. At least based on the above-described network device, software of another network device can be updated.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method of updating software of a device over a network, comprising:
   obtaining a location of an update server required to update the software of the device and information regarding a version of the software from the device, by a control device that performs control operations within the network;
   determining whether the updating of the software is required based on update information regarding the device, by the control device; and
   updating the software of the device by controlling the device when the updating is required, by the control device,
   wherein the device contains the location of the update server, and
   wherein the obtaining the location of the update server and the information regarding the version of the software by the control device comprises:
   the control device requesting the device to provide the location of the update server and the information regarding the version of the software; and
   the device providing the control device with the location of the update server and the information regarding the version of the software in response to the control device's request.

2. The method of claim 1, further comprising:
   the device requesting the update server to determine whether the updating of the software of the device is required; and
   informing the control device that the updating is required when it is determined that the updating is required.

3. The method of claim 1, wherein the network is a universal plug and play network, and the location of the update server and the information regarding the version of the software are contained in a device description.

4. The method of claim 1, wherein the requesting and the providing of the location of the update server and the information regarding the version of the software are performed using an event generated using eigen variables of a vendor of the universal plug and play network.

5. The method of claim 1, wherein the updating of the software comprises:
   the control device informing the device that the updating of the software is available;
   the device requesting the control device to update the software of the device in response to the information that the updating of the software is available;
   the control device transmitting files required for the updating to the device in response to the device's request; and
   the device updating the software using the files.

6. The method of claim 5, wherein the informing that the updating of the software is available, the requesting the control device to update the software of the device, the transmitting of the files required for the updating to the device, and the updating the software are performed using an event generated using eigen variables of a vendor of the universal plug and play.

7. The method of claim 1, wherein the control device requests the update server to determine whether the updating of the software is required, using a common gateway interface script.

8. A network device, connected to an update server and at least one other network device, for updating software of said at least one other network device, said network device comprising:
  a control circuit configured to determine whether the updating of the software is required based on at least update information of said at least one other network device; and
  a transceiving unit configured to communicate with said at least one other network device and said update server,
  wherein said network device obtains location information of said update server from said at least one other network device,
  wherein said network device controls said at least one other device such that the software of said at least one other device is updated,
  wherein said at least one other network device contains the location information of said update server, and
  wherein the obtaining the location of the update server by the network device comprises:
    the network device requesting the at least one other device to provide the location of the update server; and
    the at least one other device providing the network device with the location of the update server.

9. The network device according to claim 8, wherein the network device requests the update server to determine whether the updating of the software of said at least one other network device is required.

10. The network device according to claim 8, wherein said network device receives information indicating that the updating of the software is required.

11. The network device according to claim 8, wherein said network device and said at least one other network device are connected within a same network, and said same network is a universal plug and play network.

12. The network device according to claim 8, further comprising a memory configured to store said at least update information of said at least one other device.

13. A method of updating software of a device by another device over a network, comprising:
  obtaining a location of an update server required to update the software of the device and information regarding a version of the software, by a control device that performs control operations within the network;
  determining whether the updating of the software is required based on update information regarding the device, by said another device;
  providing a result of said determining operation to said control device, by said another device;
  transmitting one or more files to update said device to said control device, by said another device, and
  updating the software of the device by controlling the device when the updating is required, by the control device,
  wherein said device, said another device, and said control devices are different devices,
  wherein said device contains the location of the update server, and
  wherein the obtaining the location of the update server and the information regarding the version of the software by the control device comprises:
    the control device requesting the device to provide the location of the update server and the information regarding the version of the software; and
    the device providing the control device with the location of the update server and the information regarding the version of the software in response to the control device's request.

14. A network device, connected to an update server and at least one other network device, for updating software of said at least one other network device, said network device comprising:
  a control circuit configured to determine whether the updating of the software is required based on at least update information of said at least one other network device; and
  a transceiving unit configured to communicate with said at least one other network device and said update server,
  wherein said network device obtains location information of said update server from said at least one other network device,
  wherein said network device controls said at least one other device such that the software of said at least one other device is updated,
  wherein a result of the determination of whether the updating of the software is required is provided to a control device,
  wherein said network device, said at least one other network device, and said control device are different devices, and
  wherein the obtaining the location of the update server by the network device comprises:
    the network device requesting the at least one other network device to provide the location of the update server; and
    the at least one other network device providing the network device with the location of the update server.

* * * * *